(12) United States Patent
Morris

(10) Patent No.: US 6,663,061 B1
(45) Date of Patent: Dec. 16, 2003

(54) VEHICLE SEAT LEVELING SYSTEM

(76) Inventor: William O. Morris, 1231 Bill Morris Rd., Plummer, ID (US) 83851

(*) Notice: Subject to any disclaimer, the term of this patent is extended or adjusted under 35 U.S.C. 154(b) by 0 days.

(21) Appl. No.: 10/263,850

(22) Filed: Oct. 2, 2002

(51) Int. Cl.[7] .................................................. B60N 2/00
(52) U.S. Cl. ..................... 248/188.2; 297/314; 297/325
(58) Field of Search ............................... 248/188.2, 677, 248/371, 398, 188.91, 558, 673; 297/314, 325, 463.1; 254/104; 292/342, 343; D8/47

(56) References Cited

U.S. PATENT DOCUMENTS

| | | | | |
|---|---|---|---|---|
| 2,123,484 A | * | 7/1938 | Mafera ........................ 254/104 |
| 2,672,920 A | * | 3/1954 | Altgelt ........................ 297/314 |
| 2,772,596 A | * | 12/1956 | Trussell ....................... 411/535 |
| 2,819,037 A | * | 1/1958 | Wilkin ........................ 254/104 |
| 3,021,638 A | * | 2/1962 | Kristek ..................... 248/188.2 |
| 3,171,632 A | * | 3/1965 | Jines .......................... 254/104 |
| 3,466,089 A | | 9/1969 | Stueckle ...................... 297/314 |
| 3,836,118 A | * | 9/1974 | Meyer ........................ 254/104 |
| 4,500,062 A | | 2/1985 | Sandvik ...................... 248/371 |
| 4,515,337 A | | 5/1985 | Torras ........................ 248/371 |
| 4,824,303 A | * | 4/1989 | Dinger ......................... 411/79 |
| 4,858,865 A | * | 8/1989 | Schrepfer ................. 248/188.2 |
| 5,046,694 A | | 9/1991 | Martin ..................... 248/188.2 |
| 5,249,767 A | * | 10/1993 | Mellen ..................... 248/188.2 |
| 5,372,347 A | | 12/1994 | Minnich ..................... 248/371 |
| 5,492,292 A | * | 2/1996 | Richards .................. 248/188.2 |
| 5,607,273 A | * | 3/1997 | Kecmer et al. ................ 411/79 |
| 5,992,933 A | | 11/1999 | West .......................... 297/313 |
| 6,026,920 A | | 2/2000 | Obeda et al. .................. 180/41 |

* cited by examiner

*Primary Examiner*—Ramon O. Ramirez
*Assistant Examiner*—Jon Szumny

(57) ABSTRACT

A vehicle seat leveling system for adjusting the angle of a seat to compensate for the natural road angle. The vehicle seat leveling system includes a first spacer having a first slot and a second slot, and a second spacer having a third slot and a fourth slot. The first spacer and the second spacer are positioned between the support base of a seat and the floor of the vehicle to achieve the desired side angle to compensate for the road surface side angle. The upper surfaces of both the first spacer and the second spacer have approximately the same angle ranging between 0.5–5.0 degrees. The first spacer and the second spacer may be comprised of a single unit.

20 Claims, 9 Drawing Sheets

VEHICLE SEAT LEVELING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to vehicle seat support devices and more specifically it relates to a vehicle seat leveling system for adjusting the angle of a seat to compensate for the natural road angle.

2. Description of the Related Art

Seats for vehicles have been in use for years. Seats are utilized for trucks, cars, pickups, tractors and the like for the intended purpose of comfortably supporting an operator of the vehicle. Seats are positioned within a vehicle in a manner parallel to a horizontal plane.

Unfortunately, a road surface typically peaks within the center and declines at an angle outwardly within the opposing lanes for promoting effective water drainage (often times referred to as a "crowned road" or a "cambered road"); The lane surface angle may be between 0.5–5 degrees. Hence, a vehicle operating within the right lane of a road will typically not be positioned in a level manner, but rather at a side angle declining to the right.

The main problem with conventional seats for vehicles is that they fail to compensate for the natural road angle. Another problem with conventional seats is that they are not suitable for usage over extended periods of time upon roads with angled surfaces. A further problem with conventional seats is that they do not allow for adjustment of the side angle of the seat.

Examples of patented devices which may be related to the present invention include U.S. Pat. No. 3,466,089 to Stueckle; U.S. Pat. No. 6,026,920 to Obeda et al.; U.S. Pat. No. 5,992,933 to West; U.S. Pat. No. 5,372,347 to Minnich; U.S. Pat. No. 5,046,694 to Martin; U.S. Pat. No. 4,515,337 to Torras; and U.S. Pat. No. 4,500,062 to Sandvik.

While these devices may be suitable for the particular purpose to which they address, they are not as suitable for adjusting the angle of a seat to compensate for the natural road angle. Conventional vehicle seats are not suitable for usage upon angled road surfaces for extended periods of time.

In these respects, the vehicle seat leveling system according to the present invention substantially departs from the conventional concepts and designs of the prior art, and in so doing provides an apparatus primarily developed for the purpose of adjusting the angle of a seat to compensate for the natural road angle.

BRIEF SUMMARY OF THE INVENTION

In view of the foregoing disadvantages inherent in the known types of seat supports now present in the prior art, the present invention provides a new vehicle seat leveling system construction wherein the same can be utilized for adjusting the angle of a seat to compensate for the natural road angle.

The general purpose of the present invention, which will be described subsequently in greater detail, is to provide a new vehicle seat leveling system that has many of the advantages of the vehicle seat supports mentioned heretofore and many novel features that result in a new vehicle seat leveling system which is not anticipated, rendered obvious, suggested, or even implied by any of the prior art seat supports, either alone or in any combination thereof.

To attain this, the present invention generally comprises a first spacer having a first slot and a second slot, and a second spacer having a third slot and a fourth slot. The first spacer and the second spacer are positioned between the support base of a seat and the floor of the vehicle to achieve the desired side angle to compensate for the road surface side angle. The upper surfaces of both the first spacer and the second spacer have approximately the same angle ranging between 0.5–5.0 degrees. The first spacer and the second spacer may be comprised of a single unit.

There has thus been outlined, rather broadly, the more important features of the invention in order that the detailed description thereof may be better understood, and in order that the present contribution to, the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a vehicle seat leveling system that will overcome the shortcomings of the prior art devices.

A second object is to provide a vehicle seat leveling system for adjusting the angle of a seat to compensate for the natural road angle for supporting the operator in a level manner.

Another object is to provide a vehicle seat leveling system that increases the comfort of operating a vehicle on a surface having a side angle such as but not limited to a road.

An additional object is to provide a vehicle seat leveling system that increases a vehicle operator's endurance for effectively operating a vehicle.

A further object is to provide a vehicle seat leveling system that can be easily installed upon new or existing vehicle seats.

Another object is to provide a vehicle seat leveling system that does not require removal of a vehicle seat to install.

A further object is to provide a vehicle seat leveling system that decreases operator pain, fatigue and back problems due to sitting for extended periods of time upon a side sloped surface.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

Figure 1:
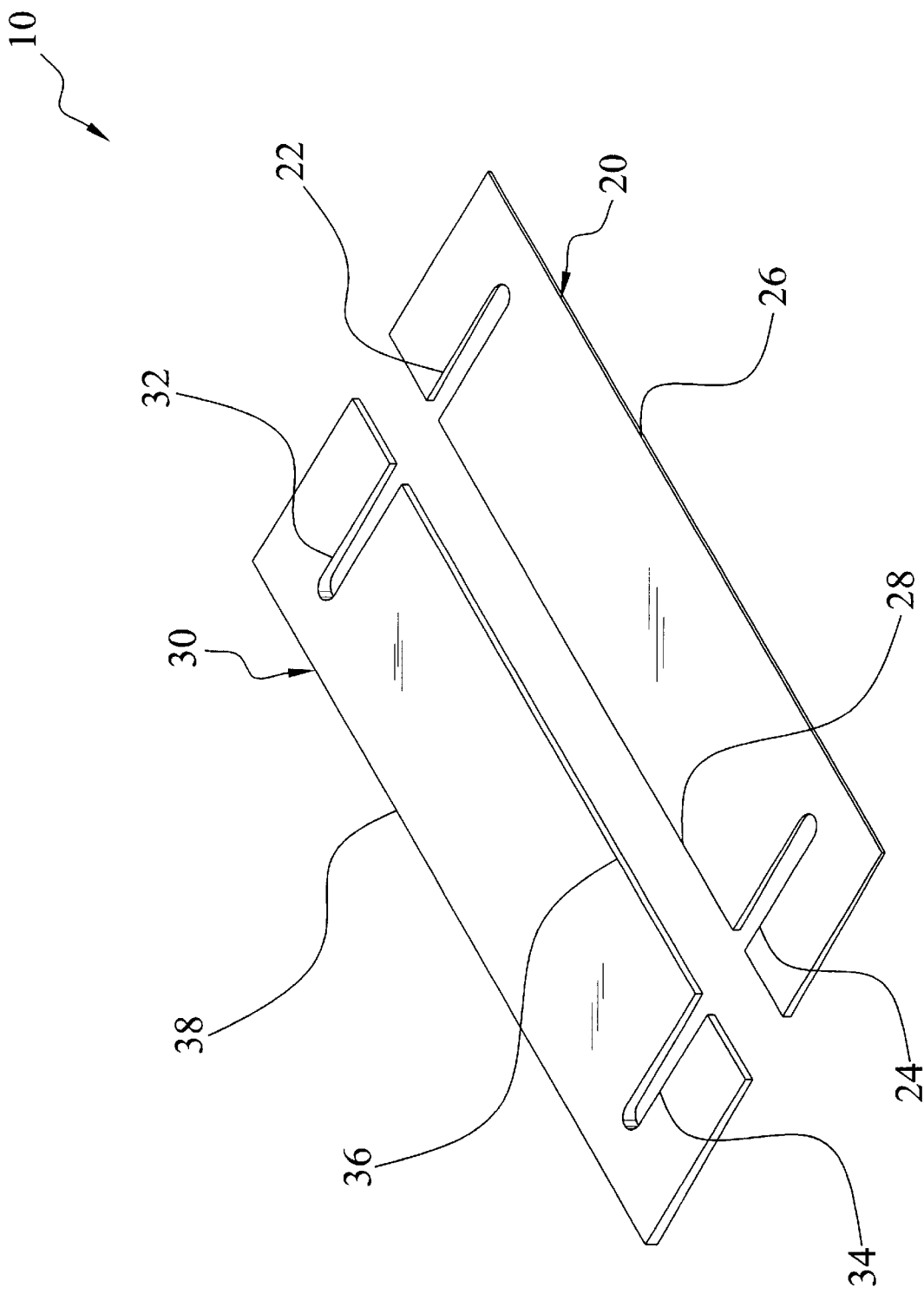
FIG. 1 is an upper perspective view of the present invention.

Turning now descriptively to the drawings, in which similar reference characters denote similar elements throughout the several views, FIGS. 1 through 9 illustrate a vehicle seat leveling system 10, which comprises a first spacer 20 having a first slot 22 and a second slot 24, and a second spacer 30 having a third slot 32 and a fourth slot 34. The first spacer 20 and the second spacer 30 are positioned between the support base 16 of a seat 12 and the floor 14 of the vehicle to achieve the desired side angle to compensate for the road surface side angle. The upper surfaces of both the first spacer 20 and the second spacer 30 have approximately the same angle ranging between 0.5–5.0 degrees. The first spacer 20 and the second spacer 30 may be comprised of a single unit.

The first spacer 20 is comprised of an elongate structure as best illustrated in FIG. 1 of the drawings. The first spacer 20 preferably has a rectangular shape, however various other shapes may be utilized to construct the first spacer 20. The first spacer 20 may be comprised of various materials having various physical characteristics such as but not limited to plastic, metal, rubber, wood, composite, fiberglass and the like.

Figure 2:
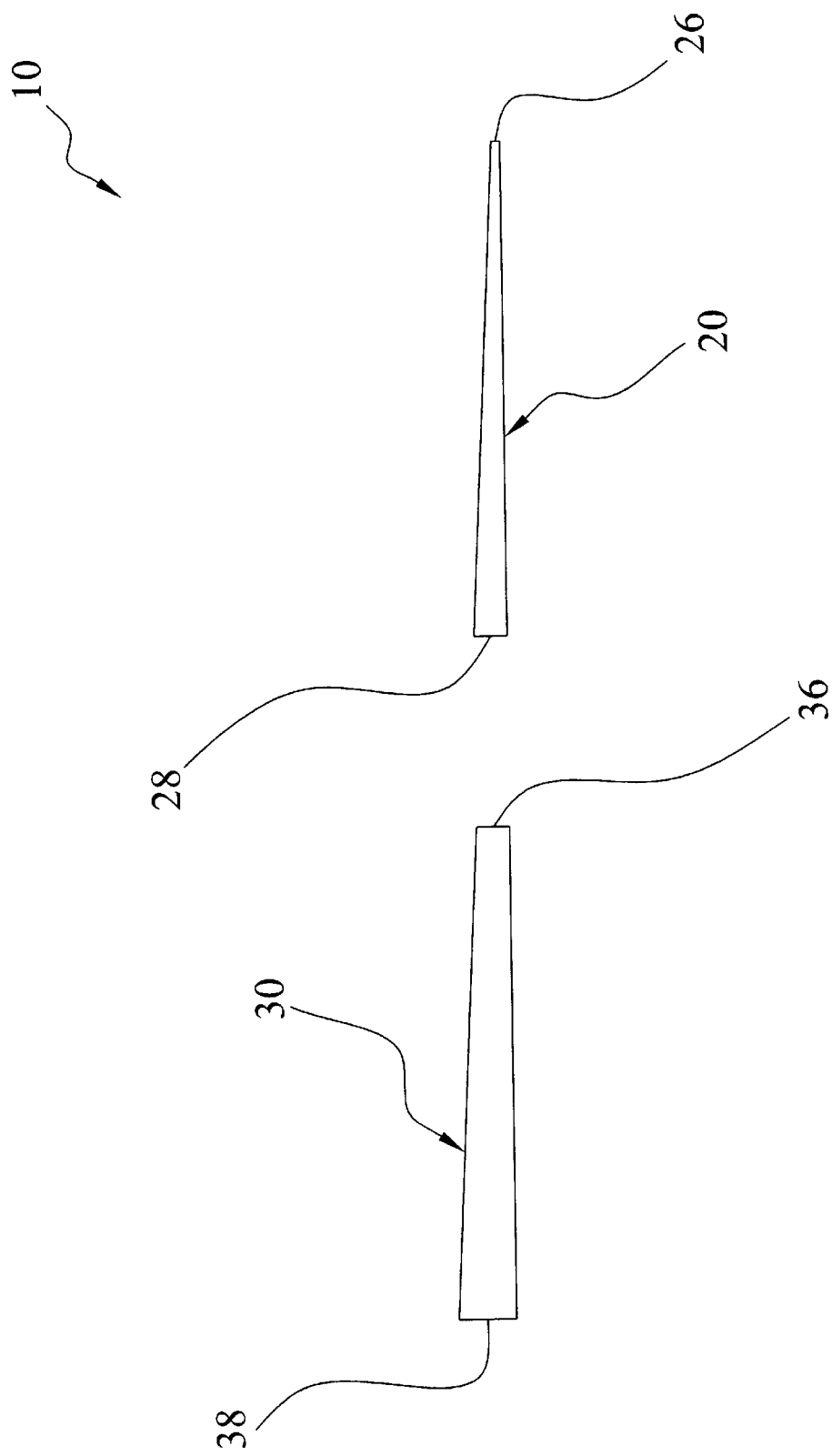
FIG. 2 is an end view of the present invention.

The first spacer 20 has a first end 26 and a second end 28 as best shown in FIG. 2 of the drawings. The upper surface of the first spacer 20 is angled downwardly from the second end 28 to the first end 26 at an angle A with respect to a plane of the bottom surface thereof. The angle A is preferably approxirmately the angle of the road surface to compensate for the right slope of the road surface. The height of the first end 26 is lower than the height of the second end 28.

As shown in FIG. 1 of the drawings, the first spacer 20 includes a first slot 22 and a second slot 24 adjacent opposing ends of the first spacer 20. The first slot 22 and the second slot 24 may have various widths sufficient to receive the fasteners 18 utilized to secure the support base 16 to the floor 14 or used to secure the seat 12 to the support base 16. The first slot 22 and the second slot 24 preferably extend inwardly from the second end 28 of the first spacer 20 a finite distance as further shown in FIG. 2 of the drawings. The first slot 22 and the second slot 24 allow for the sliding of the first spacer 20 beneath the support base 16 by simply loosening the fasteners 18 instead of removing the entire support base 16 from the floor 14. The same applies to the loosening of the seat 12 from the support base 16.

Figure 5:
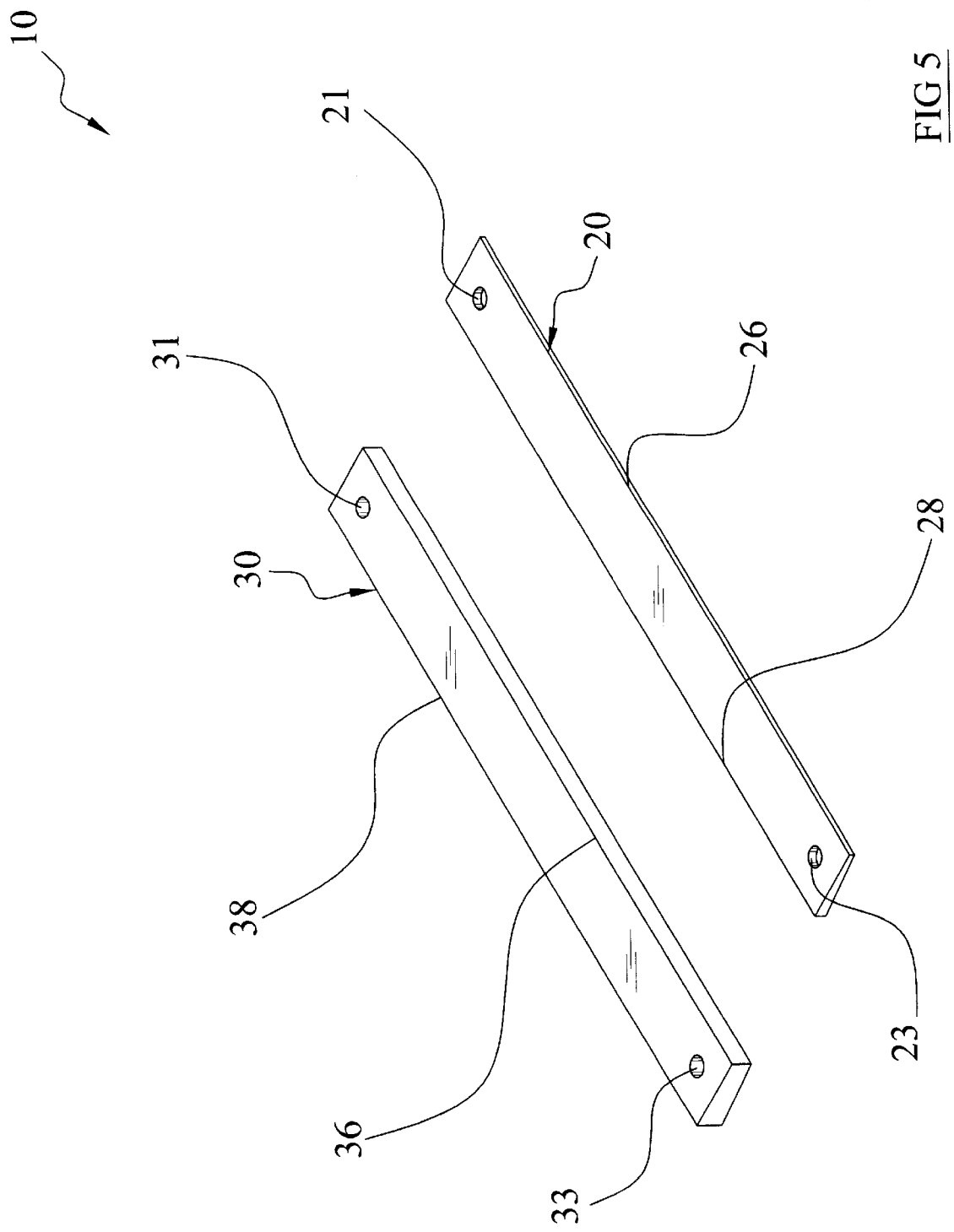
FIG. 5 is an upper perspective view of an alternative embodiment of the present invention.
Figure 6:
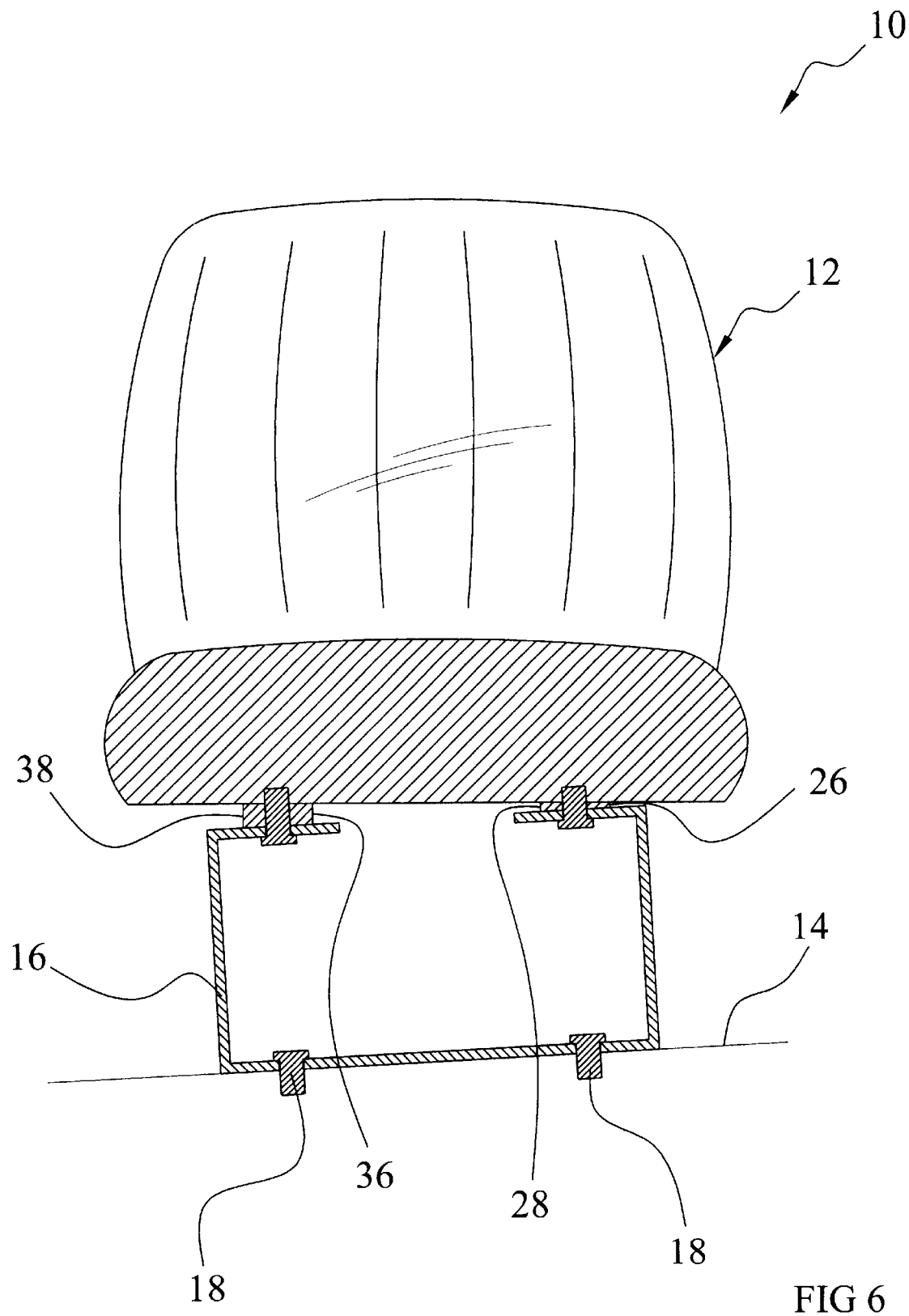
FIG. 6 is a front cutaway view of the alternative embodiment of the present invention.
Figure 7:
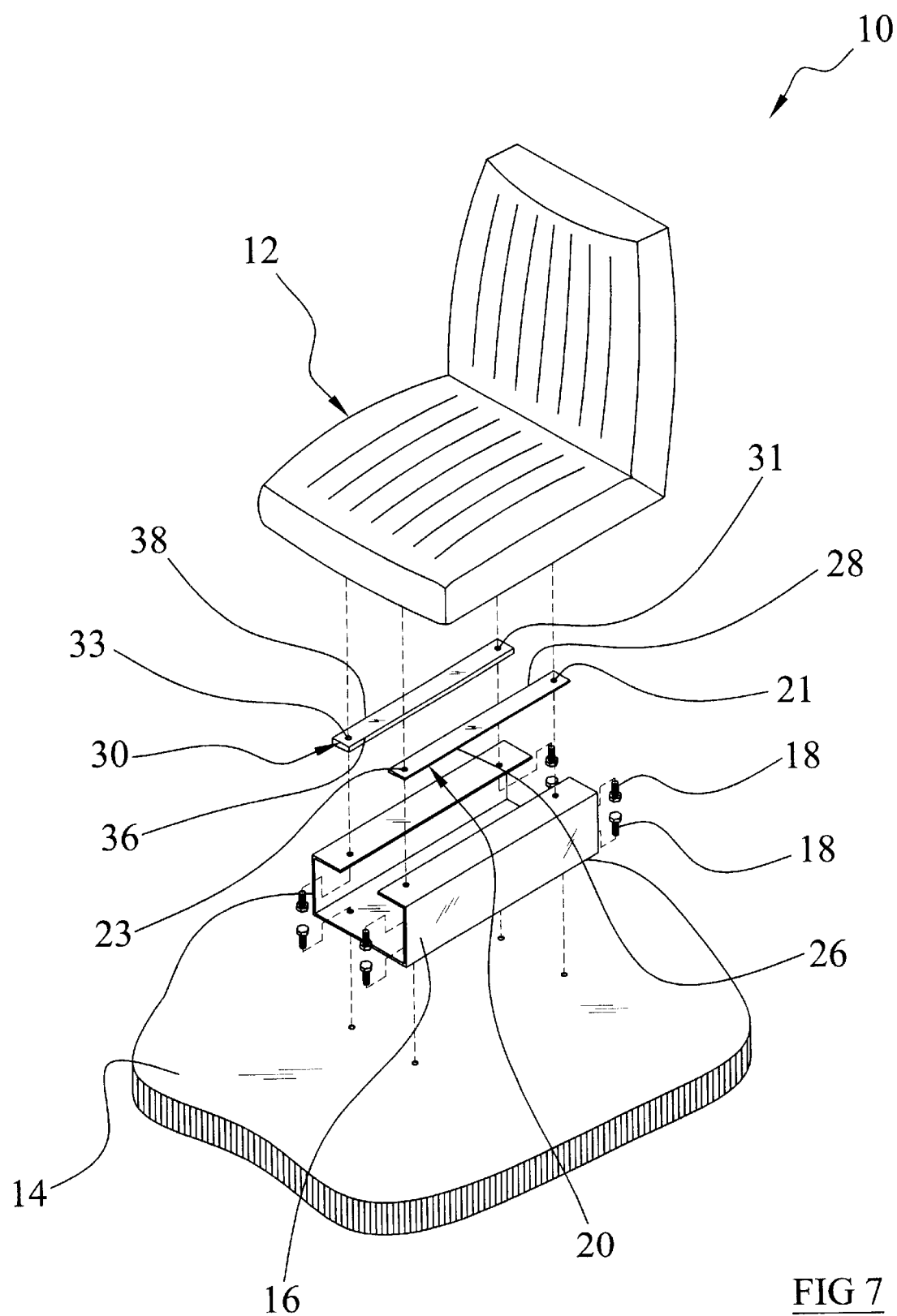
FIG. 7 is an exploded view of the alternative embodiment and a vehicle seat.
Figure 8:
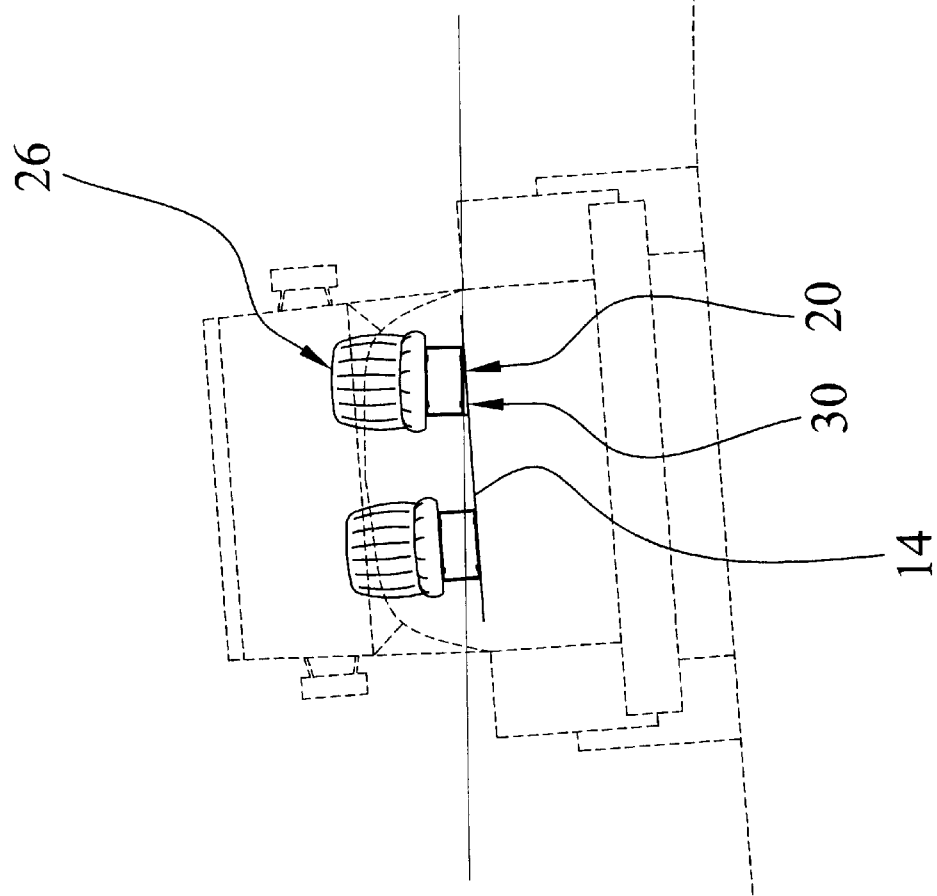
FIG. 8 is a front view of the present invention adjusting a vehicle seat within a vehicle driving upon a side sloped road.

Alternatively as shown in FIG. 5 of the drawings, a first aperture 21 and a second aperture 23 may extend through the first spacer 20 instead of the first slot 22 and the second slot 24. The first aperture 21 and the second aperture 23 are aligned with the fasteners 18 that extend either through the seat 12 from the support base 16 or with the fasteners 18 that extend into the floor 14 from the support base 16. Usage of the first aperture 21 and the second aperture 23 requires complete removal of either the seat 12 from the support base 16 or the support base 16 from the floor 14 for allowing attachment thereto.

The second spacer 30 is comprised of an elongate structure similar to the first spacer 20 as best illustrated in FIG. 1 of the drawings. The second spacer 30 preferably has a rectangular shape, however various other shapes may be utilized to construct the second spacer 30. The second spacer 30 may be comprised of various materials having various physical characteristics such as but not limited to plastic, metal, rubber, wood, composite, fiberglass and the like.

The second spacer 30 has a third end 36 and a fourth end 38 as best shown in FIG. 2 of the drawings. The upper surface of the second spacer 30 is angled downwardly from the fourth end 38 to the third end 36 at an angle B with respect to a plane of the bottom surface thereof. The angle B is preferably approximately the angle of the road surface to compensate for the right slope of the road surface. The angle A of the first spacer 20 and the angle B are preferably within the range of 0.5–5.0 degrees, though the actual angles may be greater or less.

Figure 3:
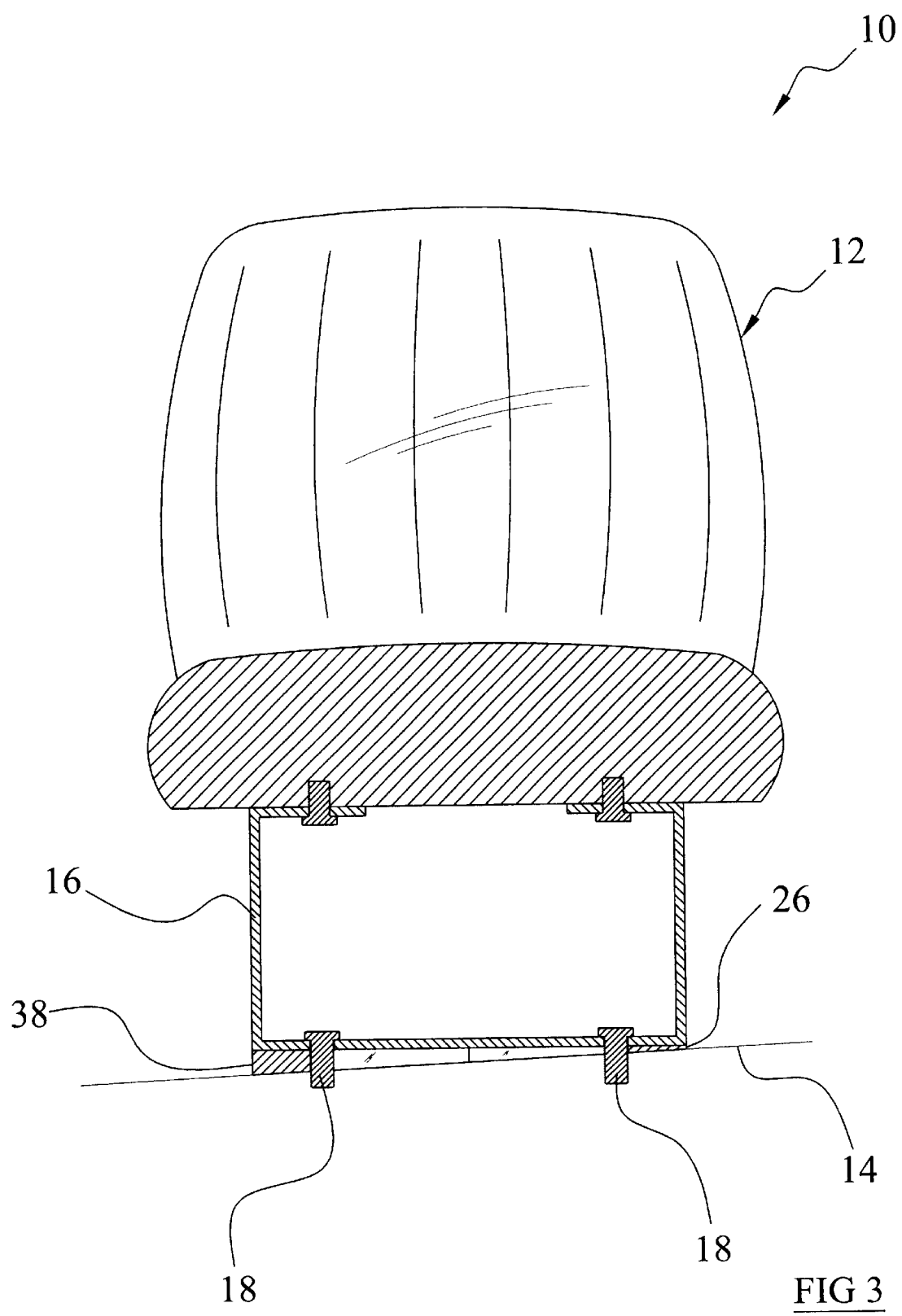
FIG. 3 is a front cutaway view of the present invention installed upon a conventional vehicle seat.
Figure 4:
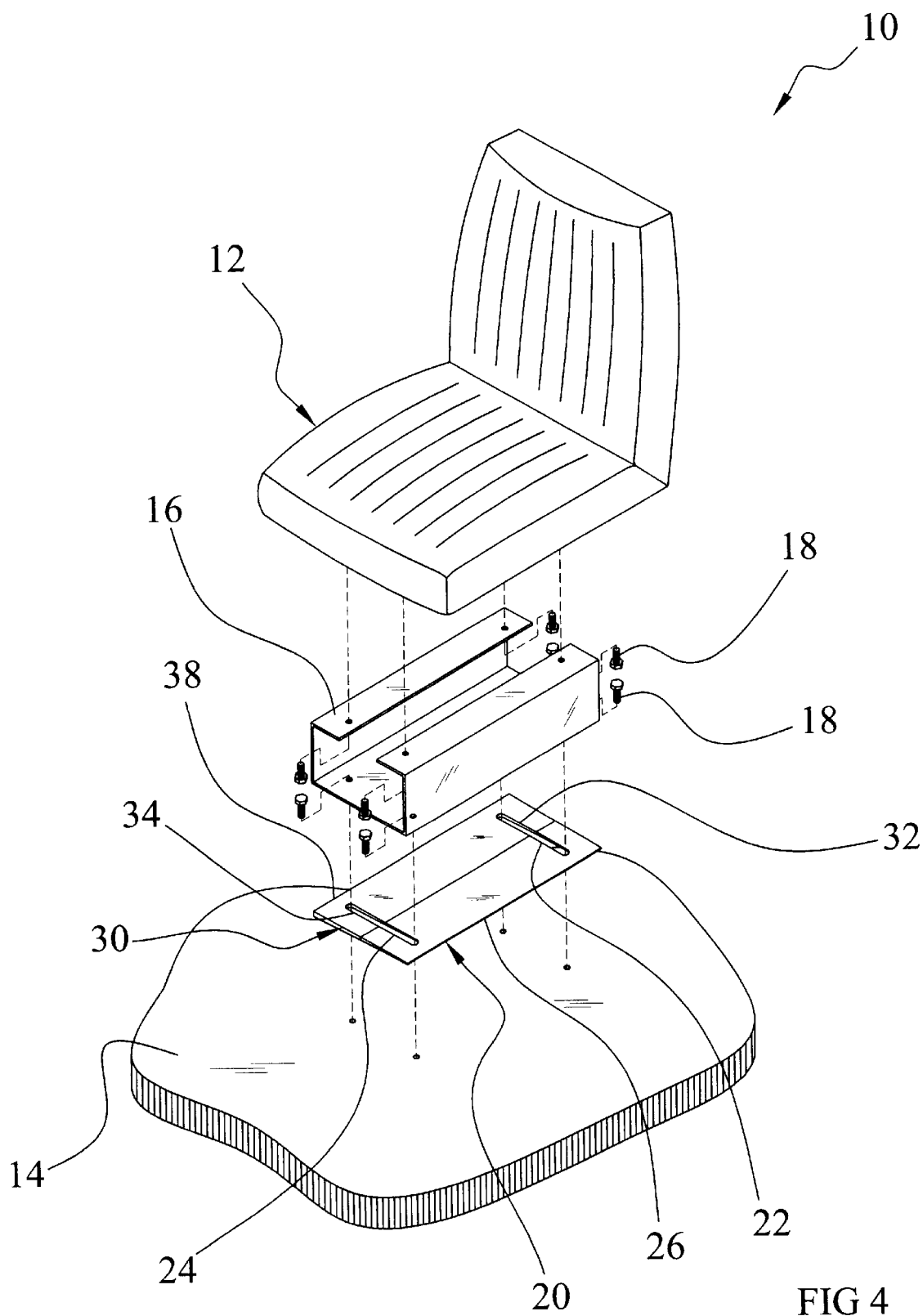
FIG. 4 is an exploded view of the present invention and a vehicle seat.

The height of the third end 36 is lower than the height of the fourth end 38 as best shown in FIG. 2 of the drawings. The height of the third end 36 is preferably approximately equal to the height of the second end 28 of the first spacer 20 for providing a substantially continuous structure when the second end 28 is positioned adjacent to the third end 36 as best illustrated in FIGS. 3 and 4 of the drawings.

As shown in FIG. 1 of the drawings, the second spacer 30 includes a third slot 32 and a fourth slot 34 adjacent opposing ends of the second spacer 30. The third slot 32 and the fourth slot 34 may have various widths sufficient to receive the fasteners 18 utilized to secure the support base 16 to the floor 14 or used to secure the seat 12 to the support base 16. The third slot 32 and the fourth slot 34 preferably extend inwardly from the fourth end 38 of the second spacer 30 a finite distance as further shown in FIG. 2 of the drawings. The third slot 32 and the fourth slot 34 allow for the sliding of the second spacer 30 beneath the support base 16 by simply loosening the fasteners 18 instead of removing the entire support base 16 from the floor 14. The same applies to the loosening of the seat 12 from the support base 16.

Alternatively as shown in FIG. 5 of the drawings, a third aperture 31 and a fourth aperture 33 may extend through the second spacer 30 instead of the third slot 32 and the fourth slot 34. The third aperture 31 and the fourth aperture 33 are aligned with the fasteners 18 that extend either through the seat 12 from the support base 16 or with the fasteners 18 that extend into the floor 14 from the support base 16. Usage of the third aperture 31 and the fourth aperture 33 requires complete removal of either the seat 12 from the support base 16 or the support base 16 from the floor 14 for allowing attachment thereto.

In second alternative embodiment, the first spacer 20 and the second spacer 30 may be attached to one another forming a single solid structure even though this structure requires complete removal of the support base or the seat. The slots 22, 24, 32, 34 may be utilized or the apertures 31, 33, 41, 43 may be utilized within the solid structure.

Figure 9:
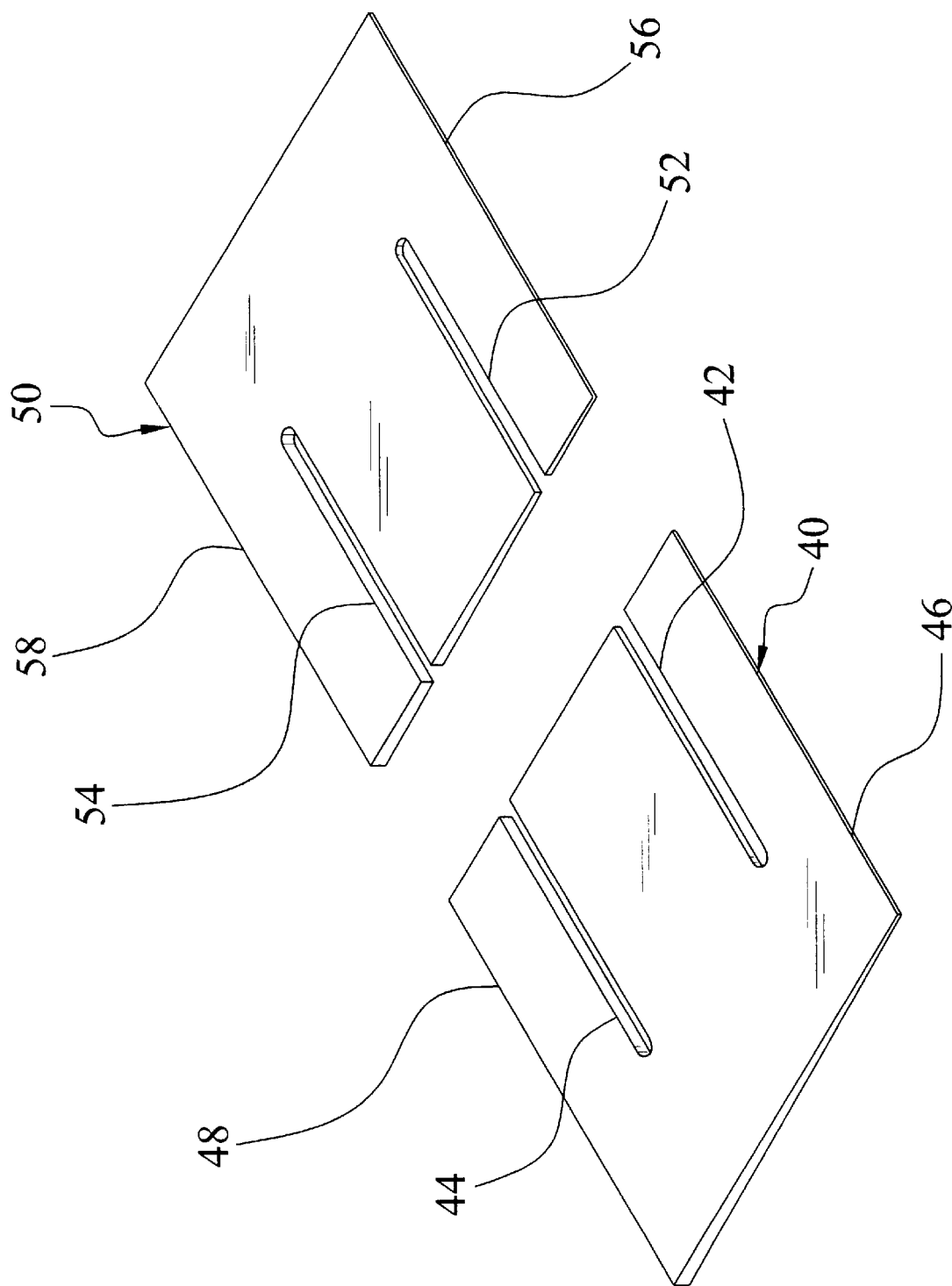
FIG. 9 is an upper perspective view of a second alternative embodiment of the present invention.

In another alternative embodiment illustrated in FIG. 9 of the drawings, a third spacer 40 is provided having a sixth end 48 tapering to a fifth end 46. The third spacer 40 includes a fifth slot 42 and a sixth slot 44 extending substantially parallel with respect to the sixth end 48 and the fifth end 46 as further shown in FIG. 9 of the drawings. The third spacer 40 is positionable beneath the seat 12 from the front thereof instead of from the side thereof as the first spacer 20. As further shown in FIG. 9 of the drawings, a fourth spacer 50 is provided having a eighth end 58 tapering to a seventh end 56. The fourth spacer 50 includes a seventh slot 52 and an eighth slot 54 extending substantially parallel with respect to the eighth end 58 and the seventh end 56 as further shown in FIG. 9 of the drawings. The fourth spacer 50 is positionable beneath the seat 12 from the rear thereof instead of from the side thereof as the second spacer 30. It can also be appreciated that the third spacer 40 and the fourth spacer 50 may include apertures similar to that illustrated in FIG. 5 of the drawings for accomplishing a similar purpose.

The width of the continuous structure formed by the first spacer 20 and the second spacer 30 is preferably sufficient to receive the fasteners 18 extending from the support base 16 into the floor 14 as best illustrated in FIG. 3 of the drawings. The continuous structure preferably has a width of between 5–10 inches, though the actual width may be greater or less. The length of the first spacer 20 and the second spacer 30 is preferably between 10–20 inches, though the actual width may be greater or less. The height of the first end 26 of the first spacer 20 is preferably between 0–5 inches, though the actual height may be greater than 5 inches. The height of the second end 28 of the first spacer 20 is preferably between 0.0625–5 inches, though the actual height may be greater than 5 inches and less than 0.0625 inches.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle seat leveling system, comprising:
   a first spacer having a first upper surface having a first angle, a first end and a second end, wherein said first upper surface declines from said second end to said first end;
   a first slot and a second slot extending within said first spacer;
   a second spacer having a second upper surface having a second angle, a third end and a fourth end, wherein said second upper surface declines from said fourth end to said third end; and
   a third slot and a fourth slot extending within said second spacer;
   wherein said second end of said first spacer is approximately equal in height to said third end of said second spacer; and
   wherein said first and second spacers are positioned in an end to end relationship with said second and third ends being adjacent to each other so as to form the vehicle seat leveling system.

2. The vehicle seat leveling system of claim 1, wherein said first angle and said second angle are approximately equal to a road surface angle.

3. The vehicle seat leveling system of claim 1, wherein said first angle is between 0.5–5 degrees.

4. The vehicle seat leveling system of claim 3, wherein said first angle is approximately 1.5 degrees.

5. The vehicle seat leveling system of claim 1, wherein said second angle is between 0.5–5 degrees.

6. The vehicle seat leveling system of claim 5, wherein said second angle is approximately 1.5 degrees.

7. The vehicle seat leveling system of claim 1, wherein said first angle and said second angle are approximately equal to one another.

8. The vehicle seat leveling system of claim 1, wherein said first slot and said second slot are substantially parallel to said second end of said first spacer, and wherein said third slot and said fourth slot are substantially parallel to said third end of said second spacer.

9. The vehicle seat leveling system of claim 1, wherein said first slot and said second slot extend from said second end of said first spacer inwardly toward said first end, and wherein said third slot and said fourth slot extend from said third end of said second spacer inwardly toward said fourth end.

10. A vehicle seat leveling system, comprising:
    a first spacer having a first upper surface having a first angle, a first end and a second end, wherein said first upper surface declines from said second end to said first end;
    a first slot and a second slot extending within said first spacer;
    a second spacer having a second upper surface having a second angle, a third end and a fourth end, wherein said second upper surface declines from said fourth end to said third end; and
    a third slot and a fourth slot extending within said second spacer;
    wherein said second end of said first spacer is approximately equal in height to said third end of said second spacer;
    wherein said first angle and said second angle are equal to one another and between 0.5–5.0 degrees;
    to wherein said first slot and said second slot are substantially parallel to said second end of said first spacer, and wherein said third slot and said fourth slot are substantially parallel to said third end of said second spacer;

wherein said first slot and said second slot extend from said second end of said first spacer inwardly toward said first end, and wherein said third slot and said fourth slot extend from said third end of said second spacer inwardly toward said fourth end; and wherein said first and second spacers are positioned in an end to end relationship with said second and third ends being adjacent to each other so as to form the vehicle seat leveling system.

11. A vehicle seat leveling system, comprising:

a first spacer having a first upper surface having a first angle, a first end and a second end, wherein said first upper surface declines from said second end to said first end;

a first aperture and a second aperture extending within said first spacer;

a second spacer having a second upper surface having a second angle, a third end and a fourth end, wherein said second upper surface declines from said fourth end to said third end; and a third aperture and a fourth aperture extending within said second spacer; wherein said second end of said first spacer is approximately equal in height to said third end of said second spacer;

wherein said first and second spacers are positioned in an end to end relationship with said second and third ends being adjacent to each other so as to form the vehicle seat leveling system.

12. The vehicle seat leveling system of claim 11, wherein said first angle and said second angle are approximately equal to a road surface angle.

13. The vehicle seat leveling system of claim 11, wherein said first angle is between 0.5–5 degrees.

14. The vehicle seat leveling system of claim 13, wherein said first angle is approximately 1.5 degrees.

15. The vehicle seat leveling system of claim 11, wherein said second angle is between 0.5–5 degrees.

16. The vehicle seat leveling system of claim 15, wherein said second angle is approximately 1.5 degrees.

17. The vehicle seat leveling system of claim 11, wherein said first angle and said second angle are approximately equal to one another.

18. The vehicle seat leveling system of claim 17, wherein said first angle is between 0.5–5 degrees.

19. The vehicle seat leveling system of claim 18, wherein said first angle is approximately 1.5 degrees.

20. The vehicle seat leveling system of claim 11, wherein said first angle is approximately equal to said second angle, and wherein a height of said second end is at least $\frac{1}{16}$ of an inch less than a height of said third end.

* * * * *